United States Patent [19]
Dunn et al.

[11] Patent Number: 5,274,772
[45] Date of Patent: Dec. 28, 1993

[54] DATA PROCESSING SYSTEMS HAVING MEANS FOR SELECTIVELY COMBINING RECORDS INTO SIGNAL BLOCKS FOR RECORDING IN A RECORD MEDIUM

[75] Inventors: Edwin C. Dunn; Scott M. Fry; Scott A. Jackson; Neil H. MacLean, Jr., all of Tucson, Ariz.; Richard P. Reynolds, Salem, Oreg.; Richard A. Ripberger, Tucson, Ariz.

[73] Assignee: International Business Machines Corporation, Armonk, N.Y.

[21] Appl. No.: 978,859

[22] Filed: Nov. 19, 1992

Related U.S. Application Data

[62] Division of Ser. No. 372,744, Jun. 28, 1989, Pat. No. 5,200,864.

[51] Int. Cl.⁵ ............................................ G06F 13/00
[52] U.S. Cl. .................................. 395/275; 395/425; 360/48
[58] Field of Search ............... 360/8, 32, 33.1, 27, 360/28, 48, 50, 53; 371/10, 2; 364/DIG. 1, DIG. 2; 395/400, 425, 200, 275

[56] References Cited

U.S. PATENT DOCUMENTS

| | | | |
|---|---|---|---|
| 3,711,691 | 1/1973 | Breitenbach et al. | 371/21.1 |
| 4,393,445 | 7/1983 | Milligan et al. | 364/200 |
| 4,403,286 | 9/1983 | Fry et al. | 364/200 |
| 4,423,480 | 12/1983 | Bauer et al. | 364/200 |
| 4,435,762 | 3/1984 | Milligan et al. | 364/200 |
| 4,475,192 | 10/1984 | Fernow et al. | 370/94 |
| 4,603,382 | 7/1986 | Cole et al. | 364/200 |
| 4,644,533 | 2/1987 | Braff et al. | 370/94 |
| 4,800,550 | 1/1989 | Yamauchi | 369/59 |

*Primary Examiner*—Robert L. Richardson
*Attorney, Agent, or Firm*—H. F. Somermeyer

[57] ABSTRACT

Information bearing signals are recorded in one of a plurality of record formats on one record medium, such as a magnetic tape, magnetic disk, optical disk, and the like. The format selected may be commanded or based upon record lengths, in bytes. When the record length equals or exceeds a predetermined number of bytes, then one record is recorded in each signal block of the record format. When the record length is less than the predetermined number, then a second format is used which inserts several of the records in one of the signal blocks. The signal block and its packets respectively contain indications of formats such that any one of several formats may be used on one record medium and in one signal block having a plurality of variable length packets. Logical indicators, such as format marks, tape marks, and the like, may separate formats used on the storage medium.

20 Claims, 6 Drawing Sheets

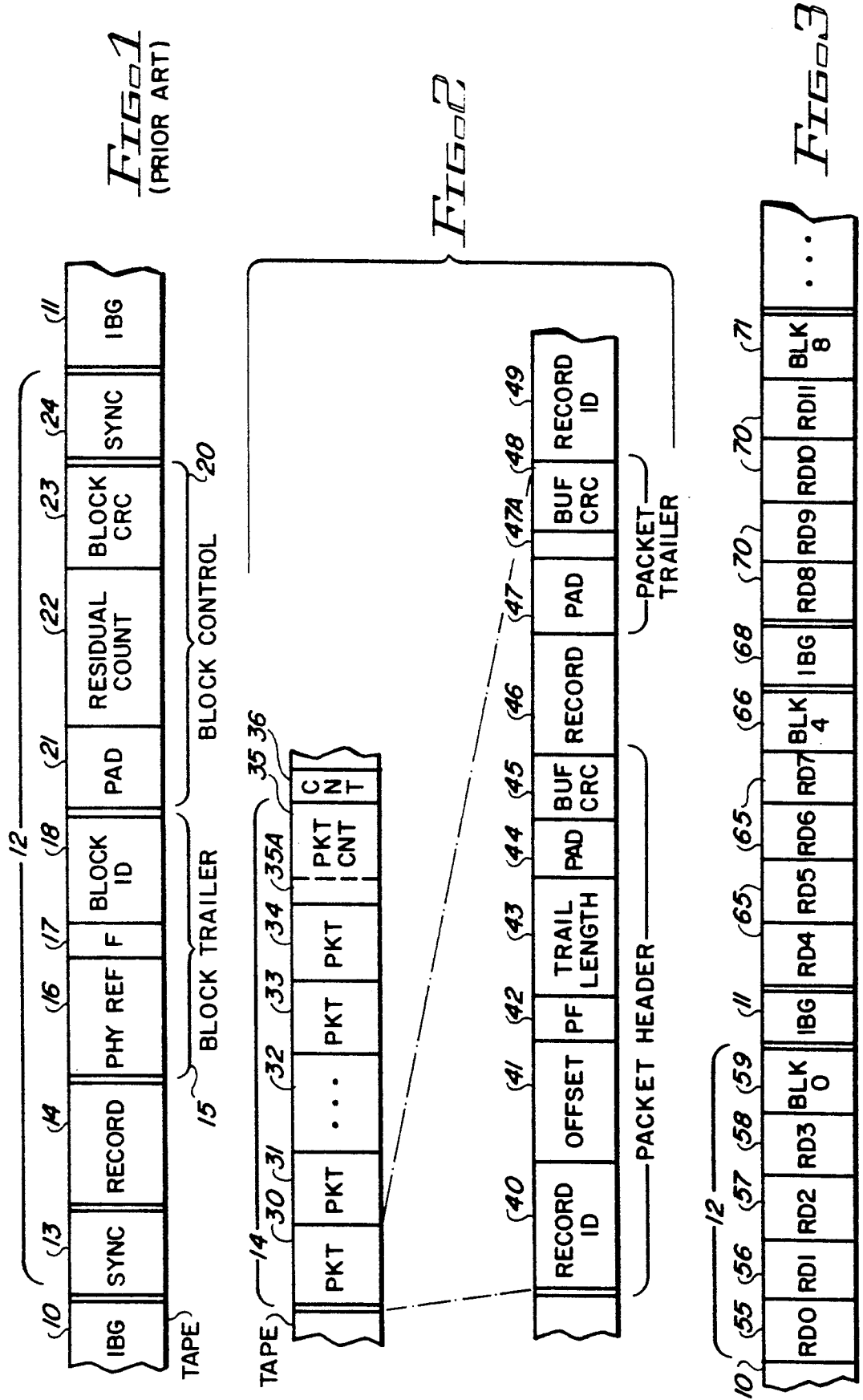

DATA PROCESSING SYSTEMS HAVING MEANS FOR SELECTIVELY COMBINING RECORDS INTO SIGNAL BLOCKS FOR RECORDING IN A RECORD MEDIUM

RELATED PATENT APPLICATION

This application is a division of co-pending application Ser. No. 07/372,744, filed Jun. 28, 1989, now U.S. Pat. No. 5,200,864.

DOCUMENTS INCORPORATED BY REFERENCE

Milligan, et al., U.S. Pat. No. 4,393,445; Milligan, et al., U.S. Pat. No. 4,435,762; Videki II U.S. Pat. No. 4,471,457; Cole, et al., U.S. Pat. No. 4,603,382; Bauer, et al., U.S. Pat. No. 4,423,480; and Fry, et al., U.S. Pat. No. 4,403,286 show a magnetic tape subsystem with which the present invention is advantageously employed and shows the initiation and control of reading and recording operations in such a tape subsystem.

FIELD OF THE INVENTION

The present invention relates to digital signal recording devices particularly to those devices which are to be used for storing a relatively large number of small records and wherein normally the number of small records would be separated by inter-block gaps or synchronizing signals and the records are variable in length.

BACKGROUND OF THE INVENTION

Digital signal recording devices such as those attached to host processors record records as single addressable units in magnetic tape subsystems. Such addressable units are a block of signals recorded on the tape as set forth in the documents incorporated by reference. Each such block on a tape is separated by a so-called inter-block gap (IBG) which can be an erased portion of the tape, a tone or other special symbol denoting such IBG. Generally the IBG's are quite long, i.e., greater than 0.1 centimeter. When a large number of small records are recorded, then the IBG's occupy a major portion of the magnetic tape resulting in reduced storage capacity. It is desired to provide for a more efficient method, apparatus and format for recording small records, particularly records of variable or indeterminate length when initially received. That is, the length of a record is determined by the host processor for each file which may consist of many records. All of the records in one file usually are the same length, for example 973 bytes, in another file to be recorded on the same tape the record length could be different, for example 3300 bytes, no limitation thereto intended. In yet another file a record could be 64,000 bytes. It is desired to provide an enhanced recording format without software intervention by a host processor. It is also desired to provide for different length records to be recorded on the same tape without intervention by a host processor and to faithfully reproduce the combined records into one block after recording.

A similar problem arises on magnetic and optical disks using fixed block architecture. In such architecture, each track is divided into a large plurality of equal sized sectors, each sector capable of storing a predetermined number of bytes, such as 2048 bytes. Recording a large number of small records on such a track, for example a record of 333 bytes requires 2024 bytes of disk space for each of the 333 byte records. This means that a little over 1600 bytes are wasted in each sector. Similarly, in count key data (CKD) format which has no identifiable sectors, each small record recorded in that format is separated by interblock gaps using the same principles set forth in tapes, as described in the documents incorporateed by reference. The invention can be applied to such disk or other recorders in the same manner as applied to magnetic tape.

DISCUSSION OF THE PRIOR ART

So called packet communication systems have combined a plurality of packets into a single transmission lock of signals. All of the packets are of a fixed length, i.e., cannot be variable length as contemplated by the present invention. Such packet systems are used often for interleaving a plurality of communication messages on a single communication channel. All of these have an object of providing an orderly flow of data through a single channel using the above described interleaved packet assignment system. Examples of such packet communication systems are found in Braff, et al., U.S. Pat. No. 4,644,533; Fernow, et al., U.S. Pat. No. 4,475,192.

Yamauchi, in U.S. Pat. No. 4,800,550 shows an optical disk recording and reproducing system having a plurality of formats. The difference in the formats is the interval between synchronizing signals. As best understood, this patent appears to provide for two different sizes of sectors on a single recording disk, which does not address the problem set forth in the Background of the Invention.

SUMMARY OF THE INVENTION

In one aspect of the invention, when the size of the record to be recorded is examined, if the size is less than a predetermined threshold, then a plurality of such records are combined into a single block of signals for recording on the storage member. Upon reading or sensing the recorded blocks, a special identifier (ID) recorded at the beginning of the block (as a header which can be a packet header for a record within a block) is sensed which indicates whether or not more than one record is recorded in the block, the size of the records and other control information. In a specific form of the invention, each block is assigned a sequence number; when a plurality of records are recorded as a single block each of the record numbers will be assigned a sequence number within the storage member and the block will be assigned a block number which is indicative of the first record recorded in the respective blocks. Each record in a block is formatted into a "packet". The size of the records combined in a given block may vary from record to record.

The foregoing and other objects, features and advantages of the invention will be apparent from the following more particular description of a preferred embodiment of the invention, as illustrated in the accompanying drawing.

BRIEF DESCRIPTION OF THE DRAWING

FIG. 1 diagrammatically illustrates a block format used in the prior art such as that used in the system described by U.S. Pat. No. 4,463,286 in the documents incorporated by reference.

FIG. 2 diagrammatically illustrates incorporating the teaching of the present invention into the FIG. 1 illustrated format.

FIG. 3 diagrammatically illustrates the assignment of block and record numbers in a data portion of the FIG. 1 illustrated format while using the present invention.

DETAILED DESCRIPTION

Figure 4:
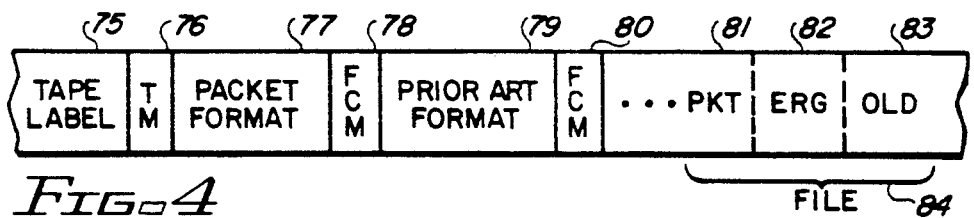
FIG. 4 diagrammatically illustrates a magnetic tape using the FIG. 1 format but incorporating the invention for enabling a plurality of different data formats on a single storage member.

Referring now more particularly to the drawing like numerals indicate like structural features and operations in the various figures. FIG. 1 illustrates a prior art tape block which is defined at its extremities by a pair of inter-block gaps (IBGs) 10 and 11. Block 12 at its end portion facing the beginning of the tape includes a clock synchronizing set of signals 13 on each of nine (9) or eighteen (18) tracks. A single record 14 of data is stored immediately following the synchronizing portion 13. Block trailer 15 includes a physical reference number 16 (PHY REF), a flag field F 17 and a block ID 18. The physical reference 16 indicates the general physical location along the length of the tape while the block ID 18 is a sequential number assigned in each block of each tape record as set forth in the documents incorporated by reference.

Block control 20 includes pad bytes 21 for causing the length of block 12 to be an integral multiple of a number of bytes which is compatible with the format, a residual count field 22 which indicates the number of pad byte 21, and block CRC 23 used to verify the integrity of block 12. It is to be understood that record 14 includes its own error detection and correction redundancies. A postamble synchronizing set of signals 24 completes the block. Synchronizing signals 13 and 24 are symmetrical for allowing forward and backward reading, i.e., away from the beginning of the tape or toward the beginning of the tape.

FIG. 2 illustrates a format arrangement of the record portion 14 generated in practicing a preferred embodiment of the present invention. Each block may be divided into a plurality of packets PKT 30-34, each packet having one record. PKT CNT (packet count) 35 indicates the number of packets in the block. Byte count field CNT 36 indicates the summation of the original lengths of the host supplied records. A preferred block size in the illustrated embodiment was about 64KB (KB indicates thousands of bytes). Depending upon the size of records put into the respective packets, the number of packets in the block can change dramatically for accommodating variable size records. All packets have the same format. The portion of the packet closest to the beginning of the tape is record ID 40 which indicates a sequential or serial number of the record stored in the packet. Offset field 41 points to the last byte position of the record 46 stored in the packet. The byte address within the block of the next ensuing packet, such as packet 31, is indicated by the offset value of fields 41 respectively and the trailer length indicated in field 43. In this manner, each of the packets 30-34 within a block can be located and delineated by using the byte address fields and from byte offset addressing. Remember the byte addressing begins at the end of the synchronizing field 13 and extends through the end of the record field 14. Field PF 42 is a packet flag field for indicating information about the instant packet. As one example, a given flag within field PF 42 can indicate whether or not it is the last packet in the recorded block of packets. If there is one packet in a block, of course, then that packet will have the last packet indication set in PF field 42. Field PF 42 may indicate format information about the record 46 field to enable multiple data representation schemes to be used for the respective stored records. In particular, PF field 42 identifies the current packet and the format of the data in such current packet. This identification enables each packet to employ its own format independently of the data format used in any other packet. Trailer length field 43 is set to a value for indicating the number of bytes within the trailer portion including fields 47 through 48. The packet trailer length field 43 is in the header portion of the packet which includes fields 40-45 for facilitating processing in the buffer for finding the next successive packet header. A preset number of zero bytes are written in pad field 44 for making the buffer CRC bytes in field BUF CRC 45 the last two bytes in the header. The buffer CRC in field 45 operates only on the data contained in the header consisting of fields 40-45. Following the header is the actual record in record field 46. The trailer portion includes pad field 47 consisting of a variable number of bytes followed by the buffer CRC field BUF CRC 48. The number of pad bytes in pad field 47 is such that the buffer CRC field 48 will always be the last two bytes of a fixed length (32 bytes) data page to be recorded, also termed a buffer page. Regarding the arrangement described above for a block, please note that the prior art record format does not include the 32 byte buffer or data page. For arbitrary reasons, the packet length is an integral multiple of 32 bytes in the described embodiment. Buffer CRC field 48 is also the last portion of the packet 30. Immediately adjacent field 48 is the first field record ID 49 of packet 31. Identifications of all packets are by the above described offset value in field 41 and the trailer length indicated in field 43. With each packet having signals defining the location of a next succeeding packet, packets in each block 12 can vary in length. It is also to be understood that the error detection and correction system for the record portion 14 is not shown in FIG. 2, but is automatically inserted and deleted after data leaves the buffer and before it is recorded on tape and deleted before the data is put into the buffer as corrected data, as is well known.

In accordance with one aspect of the present invention, a block ID 18 is also used as a format change mark (FCM). In such an instance in the FIG. 1 illustrated format, block 12 has a multiple byte record 14. When reading a block 12, the control unit (see documents incorporated by reference) first analyzes block ID 18. When the block ID 18 signal pattern indicates a sequential number, as in the prior art, then the record 14 is user data. On the other hand, unique signal patterns not used for indicating sequential block numbering are available and are assigned to the block ID as indicators of format changes in the storage member. Two examples of such changes are from the prior art format of FIG. 1 to the format of the present invention as shown in FIGS. 2-4, and a change from the FIGS. 2-4 format back to the prior art format. The FCM need only indicate the new format such that a plurality of formats may be used in a record member. The FCM enables changing recording format within a file (tape marks (TM) in the prior art, denote file extremities). Since the selection of numerical and control patterns are arbitrary, they are not shown, any pattern selection will suffice for practicing the present invention.

While the format of an FCM can be unique, such as a tape mark, the format used in the illustrative embodiment is similar to the FIG. 1 illustrated format and arranged such that the FCM is also readily identifiable when reading the packet format shown in FIGS. 2-4. The sync fields 13 and 24 bound the FCM data as shown in block 12. Block trailer 15 and block control 20 are included in each FCM 78, 80. Flag field F 17 indicates the block is an FCM. When the field F 17 is "00", the FIG. 1 format is indicated, when it is "01" the packet format of FIGS. 2-4 is indicated while a "11" indicates an FCM. The sequence numbers constituting the block ID 18 sequential numbers have a range from zero through 3FFEFF (hex) while the indicators for format marks, such as an FCM, have a range from 3FFF00 through 3FFFFF (hex) for indicating up to 256 different format or other marks. An FCM is not only indicated by a flag field indication, but also the value of the assigned block ID number.

No limitation is intended for indicating an FCM, tones, special tape marks and the like may also be used to indicate a next ensuing format; for purposes of flexibility the FCM created as a separate block of signals derived from the formats indicated allows other patterns to be used for different purposes. The described arrangement facilitates analysis of the FCM, a very short block of signals, by the Bauer, et al. microprocessor without the need for special circuits to detect an FCM.

FIG. 3 illustrates the block and record numbering system used in the present invention. The numbers begin at the beginning of tape and increase toward the end of tape, each record being assigned a number. A first block 12 disposed between IBGs 10 and 11 is shown as having four (4) records, RD0 through RD3 respectively denominated by numerals 55-58. The block number in field 59 is block 0 and corresponds to the block ID field 18 of FIG. 1. The block of signals located between IBG 11 and IBG 68 also has four records 65 which are individually numbered 4 through 7.

The block number in field 66 is 4, corresponding to the lowest numbered record in the block. In a similar manner, the records 70 in the block located between IBGs 68 and 71 have a block number of 8 that is the same as the lowest record number in the block. As the record sizes change between the files, the number of records in the blocks also change which indicates that the succession of block numbers will also change, i.e., rather than 0, 4 and 8, it could be 0, 5 and 10, and so forth. In this manner, which records are in which blocks are easily identified. Block ID sequences can be checked by adding the packet count to the ID of the first packet 30; equality should occur between these two values.

FIG. 4 illustrates a plurality of different block formats on a single storage member or tape. At the beginning of the tape is a tape label 75 which may contain control information about signals recorded on the tape. In general the tape label 75 will be written in the old format which will include one record per signal storage block. A known tape mark TM 76 separates the tape label 75 from other recorded data. The first tape area 77 happens to store relatively small records which causes the later described set of machine operations. The packet format is used for small or short records, as described in FIGS. 2 and 3. The end of the area 77 is indicated by FCM 78. In the area 79, the records happen to be recorded as one record per block of signals called the prior art format. Completing or terminating the area 79 is an FCM 80. Following FCM 80 may be several format changes, some of which use the packet format, all format selections preferably depending upon record length and others based on program controls, i.e., such as one of the host processor 212 using a MODE SET command 400 (FIG. 12) to select a format to be used in recording.

Figure 11:
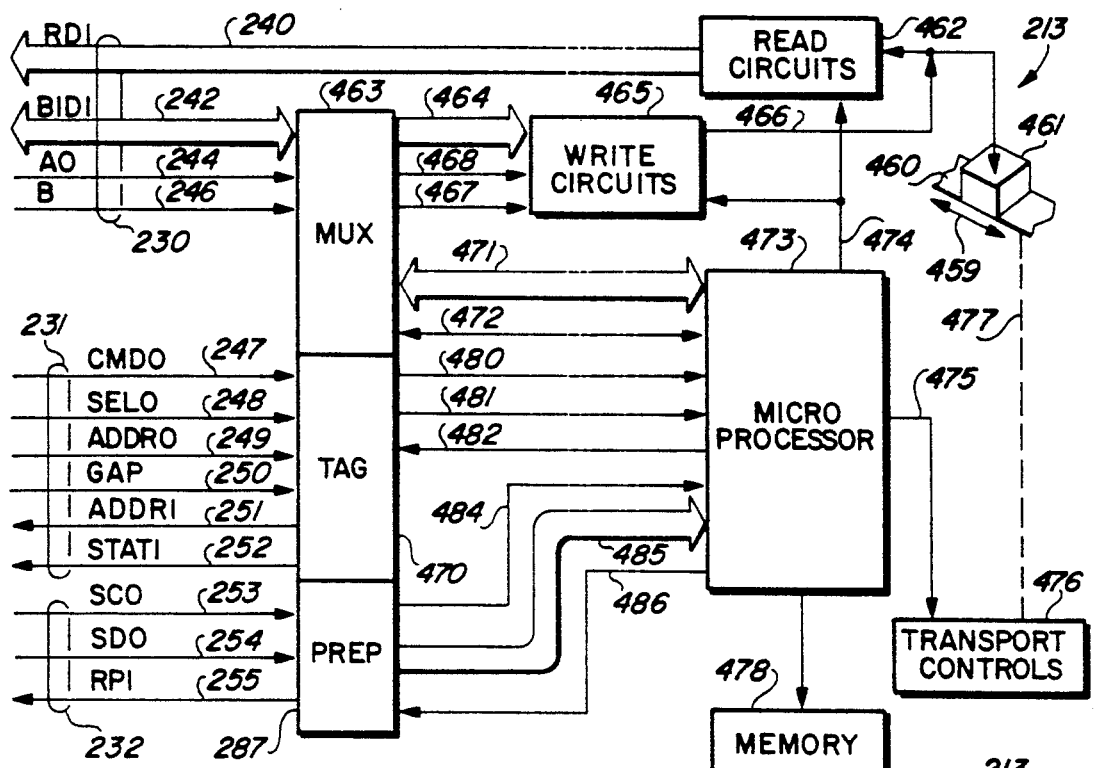
FIG. 11 is a simplified block diagram of a peripheral device attached to the FIG. 8 illustrated control unit.

While it is preferred to use an FCM to denote format changes, an erase gap (ERG) may also indicate a possible change in format. Even within a given file which has a plurality of different sizes of records, both formats can be used. File 84 includes a portion 81 which is recorded in the packet format as indicated by PKT. An erase gap ERG 82 (nominally 4 mm or longer of erased tape, for example, plus 2 mm for an IBG) denotes the end of the packet format 81 and the beginning of another format following the ERG 82. As it turns out, the old format of one record per block of signals is recorded in portion 83 of file 84. When beginning of the tape is not indicated by a tape mark TM 76 or a tape label 75, beginning of the tape is known to the system because of the loading of a tape reel onto a tape drive 213 (FIG. 11). The beginning of tape may also be optically sensed through transparent portions on the tape, for example. Other machine sensible indicia may be used as well. The end of a rewind operation also is used to indicate beginning of tape.

Figure 5:
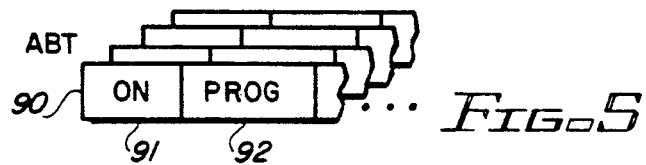
FIG. 5 diagrammatically illustrates in abbreviated form an autoblock table ABT used in connection with the FIG. 2 illustrated format.

FIG. 5 is a simplified diagram of a autoblocking table ABT 90. There is one entry in the autoblocking table for each autoblocking operation currently in progress, that is with 16 recorders (devices 213) attached to a control unit as shown by the documents incorporated by reference. Several of the 16 devices 213 could be recording data at the same time. The informational content of ABT 90 lasts for only a period of reading or writing one block of data. Field or autoblocking bit 91 indicates whether or not autoblocking is ON. If autoblocking bit 91 is ON, then field 92 indicates the progress by record count of the autoblocking bit 91 operation. Other fields in ABT 90 (FIG. 5) include the size of the record, size of the padding, and values in the header and trailer portions as described for FIG. 2. Pointer systems are used for indicating where in each data buffer 215 (FIG. 8) the records are to be placed, for example one portion of a buffer 215 is reserved for assembly for recording a block of data. If block 12 is to be recorded and record zero has a first offset within block 12, record one a second offset and so forth, all as described for FIG. 2. Generating record offsets within a buffer or data storage system is well known and not further described for that reason.

The documents incorporated by reference show the hardware environment which the present invention is preferably incorporated and also together with the description herein represent preferred embodiment of the invention. The Bauer, et al. U.S. Pat. No. 4,423,480 shows a general arrangement for a magnetic tape storage subsystem. As seen in FIG. 8 herein, a plurality of utilizing hosts 212 operate through a set of channel adapters 280 to two so-called control units 211. Each of the control units 211 has a data buffer 215 for temporarily storing data that are being transferred from a one of the utilizing hosts 212 to the various devices 213, such as magnetic tape units. FIGS. 8-11 illustrate a peripheral subsystem which advantageously uses the present invention and is based on the teachings of Bauer et al., supra. The later described machine operations in FIGS. 6 and 7 operate primarily with the buffers 215, that is the data that are received from a utilizing host 212 for recording on tape 460 (FIG. 11) in the tape units 213 are analyzed and selectively repackaged into a block of signals as shown in FIGS. 2 through 4 of this description. Similarly, while reading data from a tape 460, drives D1-D12 (FIG. 8) for transferring the read data to the utilizing hosts 212 (FIG. 8) the blocks of signals are analyzed such that the records for the host are identified and separately sent to the utilizing hosts. As set forth above, byte offset addressing is used within the block of signals for identifying the records. Such base plus offset addressing is well known and is not detailed here for that reason. The Milligan, et al. U.S. Pat. No. 4,393,445 shows the assignment of block IDs in the prior art format of FIG. 1, such as the numbers entered into field 18. All of the later illustrated machine operations are microprogram effected, such as in the microprocessor shown in the documents incorporated by reference.

Figure 12:
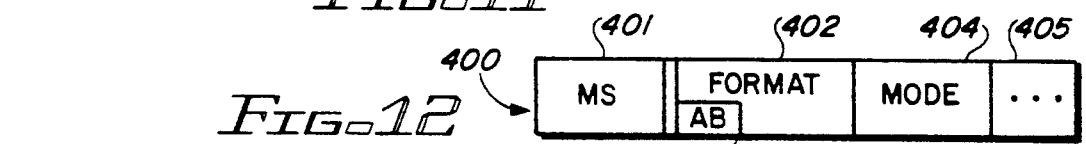
FIG. 12 diagrammatically shows a mode set command usable with the FIG. 8 illustrated system.

Whether or not the data received from the utilizing host are subject to the autoblocking feature of this invention is determined by a known so-called mode set command, as shown in Videki II U.S. Pat. No. 4,471,457, has been used for setting operation modes in peripheral subsystems. In accordance with the invention, as shown in FIG. 12, the mode set command is expanded to instruct the control units to either enable or disable autoblocking. When autoblocking is enabled, the bit 91 of ABT 90 of FIG. 5 is set to the active condition. There is one entry for each device D1-D16 in ABT 90. Each mode set command accesses the entry of ABT 90 for the device addressed by such command to insert command data in the accessed entry; i.e. which format is to be used in recording (FIG. 1 of Bauer, et al., supra) such that a current mode of operation for each of the devices is selected by the using host processor. When virtual addresses are added to the devices 0 through F, then the number of entries in ABT 90 is increased such that for each virtual address there is one ABT 90 entry for controlling the autoblocking operation.

The above described FIG. 12 illustrated mode set command 400 is preferably only in the same chain of commands in which the recording data transfer is to occur between the host and the recording device. Depending on the mode, the mode set command 400 can be in a chain of commands executed earlier than the data recording chain of commands. The term chain of commands is a known term and is also described briefly in the Bauer, et al., supra, and Videcki U.S. Pat. No. 4,471,457, as well as in other documents. In another mode of operation, the mode set command 400 is used only during a chain of commands in which the data transfer occur. At the end of the command chain the autoblocking mode can be automatically reset within the control unit or a second mode set command may be issued by the host processor to disable the autoblocking, i.e., reset bit 90 for the device indicated in the mode set command. Power on reset also resets the autoblocking bit 91. By arbitrary protocol in the preferred embodiment, if a mode set command 400 is not received in the chain of commands for a write data transfers then the control unit will reset bit 91 for the device addressed by the chain of commands. The mode set to autoblocking enables the determination, based on record length, whether or not autoblocking is to be used, all as will become apparent.

With autoblocking bit 91 set to the active condition, which is also termed the autoblocking mode, means that the data may be written in the packet format shown in FIGS. 2 through 4. For purposes of data integrity the block such as blocks 12, etc. are separated by the IBGs 10, 11 shown in FIGS. 1 through 4.

It is preferred that any headers, such as tape label 75, written in a one record per block format enables the storage members to be labeled before recording data thereon to indicate whether a one record per block format is used or autoblock applications reside on the storage member. It is also a convenient location and format for indicating the volume serial number of the storage member. Such a tape label 75 may indicate that a storage member has a plurality of recorded formats. In the illustrated embodiment, such indication is not usable for controlling the read back of the storage member. In the present embodiment, a tape mark TM 76 is recorded in the FIG. 4 illustrated format. Of course, the file label can be preceded by an file control mark (FCM) indicating the packet format. At beginning of the tape, for reading signals, the format is designated as being unknown; the first block is read to ascertain its format. Remember that an FCM can be interposed between blocks which store data; in such instance there is a known current format such that the FCM is recorded in that format. Accordingly, a TM 76, FCMs 78 or 80, or an ERG 81 is always written between adjacent signal blocks recorded on the storage member which have different formats, i.e., logical separators are always provided between the formats such that the reading control unit is alerted to watch for a change in format.

During reading, the FIG. 12 illustrated mode set command is not used. A control unit 211 (FIG. 8) analyzes the recorded data to ascertain which format exists in the recorded data. Any nonsequential tape motion, such as rewind, tape load, space filed (a movement of the tape without reading or recording data) or a locate record (see Milligan, et al., supra) resets the control unit operation to an unknown format state such that the first tape mark, erased gap (ERG) or beginning of tape indicator encountered requires the control unit 211 to analyze later read signals for determining which format is being sensed. An FCM indicates to the control unit the ensuing format. In a similar manner each of the logical separators, tape marks and ERGs indicate to the control unit that the format is in an unknown state.

In general, during recording, when autoblocking is specified, records received from a host processor are accumulated in a control unit buffer 215 (FIG. 8) until a minimum block size is reached, such as 32KB. Note that the header and trailer bytes in the packets and in the blocks are included in the 32KB threshold. Therefore the block 12 is usually longer than 32KB whenever the packet autoblocking system is invoked. It is preferred that for records having fewer than 32KB bytes are accumulated to exceed 32KB such that the maximum block size is about 64KB. For records larger than 32KB and less than 100KB, only one record is written within each block in the autoblocking format. Records larger than 100KB are preferably recorded on the storage member in the FIG. 1 illustrated format. The result of autoblocking is that all blocks on storage member have a length of greater than about 64KB thereby reducing the number of interblock gaps (IBGs) to an insignificant portion of the storage member.

For performing the autoblocking algorithm, as later described, a 32 byte buffer storage space is left blank for each block to be built using the later described machine operation all within the buffer of the control unit. Once the block of data signals are built within the buffer, the packet trailer pad 47 and buffer cyclic redundancy check CRC 48 is completed and then the 32 byte space for the packet header items 40 through 45 is completed. The packets are built in the above-described manner until the 100KB maximum blocking requirement is not exceeded. At this point, the packet count field 35 is built as well as the block trailer 15 and block control 20 of FIG. 1. Upon completion of the block, data transfer to tape may begin and the recording occurs as in the prior art. Because of the size of the buffer in the control unit, a plurality of such constructed blocks may be stored with a burst of such blocks being recorded to the storage member in one sequence of signal transfers.

During the recording or write process, whenever the buffer 215 in the control unit 211 becomes too full for receiving additional data from the supply and host processor, the control unit will issue a CHANNEL COMMAND RETRY (CCR) which temporarily stops the data transfer until buffer space again becomes available. A DEVICE END (DE) is sent by the control unit to the supplying host processor telling the host processor to resume transfer of the data signals. The buffer 215 in each control unit 211 is segmented for serving the various recording devices 0 through F in an efficient manner. When a segment of the buffer becomes full, additional segments can be allocated such as shown in the Cole, et al. U.S. Pat. No. 4,603,382, supra. All of the above operations are enabled with high data integrity because the packet header is written after the data transfer of the record has been completed.

Several criteria are used for terminating the building of a signal block 12 from a plurality of records into a plurality of packets 30-34. Most common is that the 64KB threshold would be exceeded by adding another record to the block. If during the building of a block of signals a tape motion command other than a write command is received, this indicates to the control unit 211 that the writing operation will probably be stopped. At this point the autoblocking is also stopped. An example of these tape motion type commands are read, read backwards, rewind, rewind unload, erase gap, write tape mark or forward or backward space block, forward or backward space file, synchronize, locate block and data security erase. Another criterion for not autoblocking is the receipt of a mode set command 400 (FIG. 12) which indicates "set tape write immediate mode". This command indicates that the data received from a supplying host processor is to be immediately written into the tape and not maintained in the control unit buffer. The receipt of such an set tape write immediate mode set command 400 causes the control unit 211 to complete the current signal block being constructed and then record that block onto the tape irrespective of the threshold. All of these mode set commands having format field 402, except for bits AB 403, are used in the prior art.

Another criterion for stopping the autoblocking operation is the set tape write receipt of a FIG. 12 illustrated mode set command 400 which indicates autoblocking is not to be used in format field 402 by indicator or code pattern AB 403. In that event the operations described for the set tape write immediate mode set are followed. Another criterion for resetting autoblocking is that the transport of the storage member, such as tape, by the recording device reaches the end of tape (EOT). At that point any incomplete autoblocking signal block is completed and a unit exception status or interrupt is presented to the host processor 212 via a so-called peripheral channel 214 using the above referred to channel adapter 280. End of tape of course means that no more signals can be recorded until a new tape is mounted. Another criterion for terminating the autoblocking operation is that the modulus of the block ID field 18 is about to be exceeded. Block ID modulus acts as a logical EOT indicating that no more signals should be written on the tape. Yet another criterion is a device 213 error. The last criterion is the receipt of a selective reset or system reset signal from the host processor 212. In these latter two events any incomplete autoblock block is completed and written to tape 460 (FIG. 11). Other criteria may also be used to complete a current autoblocking operation and then terminate the autoblocking mode.

Figure 6:
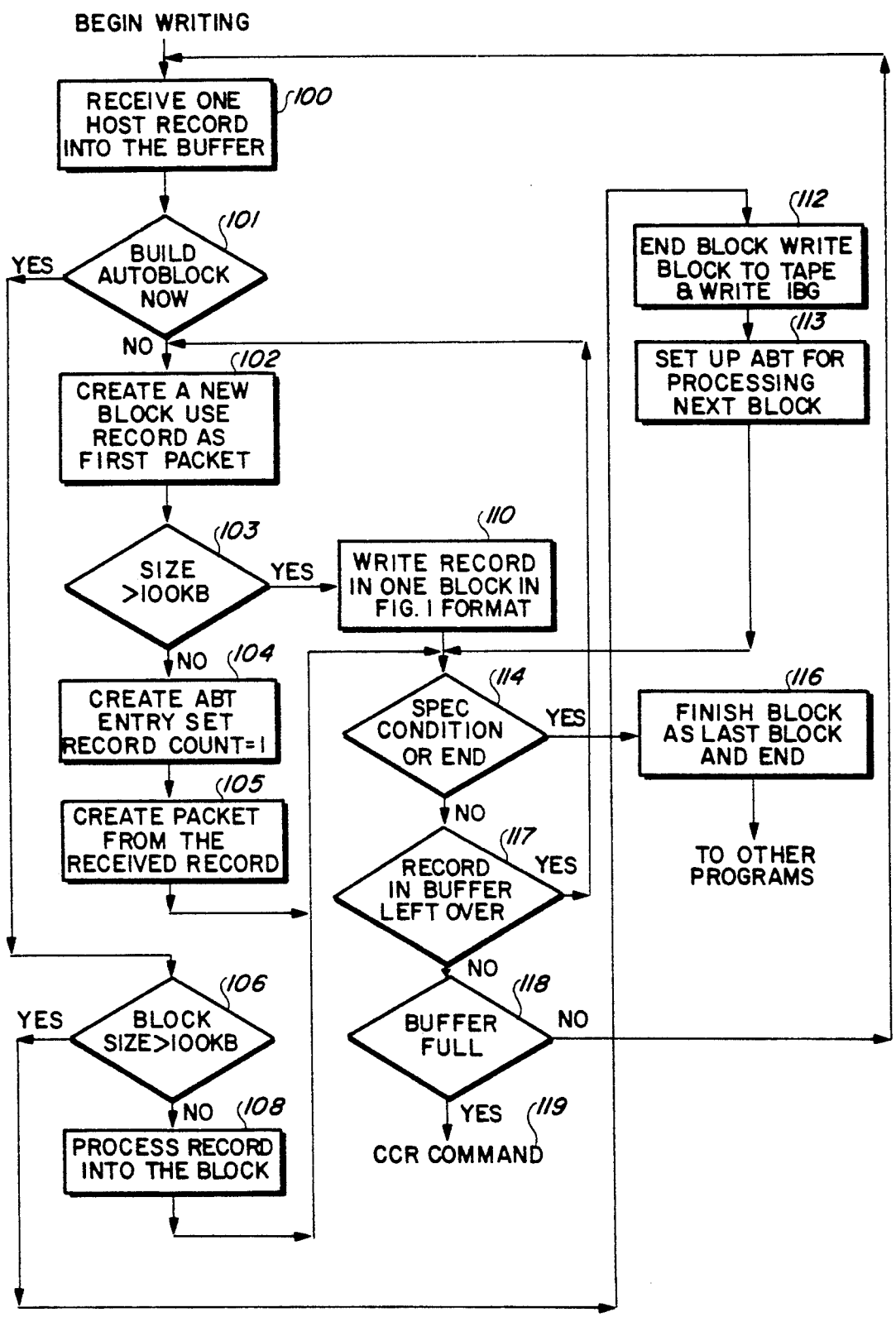
FIG. 6 is a simplified machine operations chart illustrating recording signals on a storage member using the autoblocking concept of the present invention.

FIG. 6 is a simplified machine operations chart of program effected machine operations used for illustrating the present invention. This machine operations chart is representative of the operations performed in the control unit 211 for practicing the present invention. A write command is received at step 100 and data are sent to the buffer 215. It should be noted that for this machine operations chart that the write command is any one of several write commands embedded in the chain of commands and that several write commands can insert several records into the buffer to await the FIG. 6 autoblocking operation. Step 100 also represents the autoblocking operation beginning to process a next record into the current block. Therefore, a previous write command may have been executed, as will become apparent, which resulted in an autoblocking operation. This previous operation only occurs when the above-described mode set command 400 had set the appropriate autoblocking bit 91 of ABT 90 to the active condition, i.e., the autoblocking bit 91 corresponding to the device addressed by the received write command. Autoblocking is effected for any write command then if the progress field 92 a bit is set to indicate that autoblocking has occurred as authorized by the bit 91. If at step 101 the control unit determines that an autoblocking operation to build a block is in progress. For a new block to be built (no current block), control unit 211 at step 103 determines whether or not the first record exceeds 100KB. If not, then at step 104 an ABT 91 entry is started which includes an indication that a current block is being built, the current number of records in the block, byte accumulation and the like. Then at machine step 105 the first record for the block being built is converted into a packet 30 (FIG. 2) and the packet is stored in the buffer awaiting completion of the block construction. Then, later-described machine steps 114, et seq. are executed preparatory to processing the next record to be examined for inclusion into the block just started.

If the first record is found to exceed 100KB (KB means kilobytes), then at step 110 a single record is recorded in one block. Two alternatives may occur here. The autoblocking format of FIG. 2 may be continued. It is preferred that an FCM is created and recorded indicating that the ensuing record is in the FIG. 1 illustrated format, then the large record is recorded on the storage medium in the FIG. 1 illustrated format. Upon detecting an ensuing record less than 100KB, autoblocking is automatically resumed. From machine step 110, the machine steps 114, et seq. are performed. If the next received record would create a block greater than 100KB, then the block is completed for recording by later described block terminating steps 112, 113, and such next received record is used to start a new block. If the record size sensed does not cause the block to exceed 100KB, then autoblocking bit 91 for the addressed device 213 remains set to the active condition. At machine step 104, if the record received for processing in the autoblocking operation is a first record, than ABT 90 is updated with the autoblocking for one block indicated and the number of bytes in the record to be processed into a packet of such block. At machine step 105, the record is converted to a packet to become a part of the block, the conversion is that operation to create the packet header and trailer; processing signals to a known format is easily within the skill of ordinary art and is not detailed here for that reason.

After creating a packet from a received record as shown in FIG. 2, whether or not a special condition has occurred is checked at machine step 114. Such special conditions are the receipt of a non-sequential command (rewind, an indication from the host processor to end the recording operation, etc. as set forth above) or other conditions which indicate that autoblocking should be terminated. If such a condition has been received, that at step 116 the block is finished with the last-received record irrespective of having less than 100KB accrued in the block being built. Machine step 116 includes recording the block being built in the storage member or tape 460 (FIG. 11). Then other programs beyond the current description are executed. Usually, a condition will not be encountered, then at machine step 117 it is determined whether or not the record analyzed at machine step 103 was "left over", i.e., would cause the 100KB upper limit on block size to be exceeded. If yes, then a new block is started in machine steps 102 and 104. It should be noted that the block was completed such that steps 102-105 are executed without receiving another record from a host processor (not shown). If there is no "left over" record, then at machine step 118 whether or not the buffer (see documents incorporated by reference) is full is checked. If full, the next received write command is channel command retried (CCR,d). It should be noted that this step is useful when a plurality of records are queued in the buffer awaiting autoblocking. If the buffer is not full, then the next record to be processed is received by the autoblocking operation at step 100. At machine step 101, a block is being built so that the machine operations go to step 106 to ascertain whether or not the received record at machine step 100 will cause the block size to exceed 100KB. If not, the record is processed into the current block at machine step 108 by creating a packet as shown in FIG. 2. Then machine steps 114 through 118 are repeated.

If at machine step 106, the 100KB limit would be exceeded by inserting the just received record into the current block, steps 112 and 113 are performed for terminating the block creation and recording the block onto the storage medium. At step 112, the block trailer is completed and the block is queued for writing to the storage member 460 or is directly recorded—this is a design choice and is based on known system design. At machine step 113, ABT 91 is modified to indicate no block is currently being built such that the left over record becomes the first record in the next block to build. From machine step 113, the machine steps 114 through 118 are repeated as above described.

Figure 7:
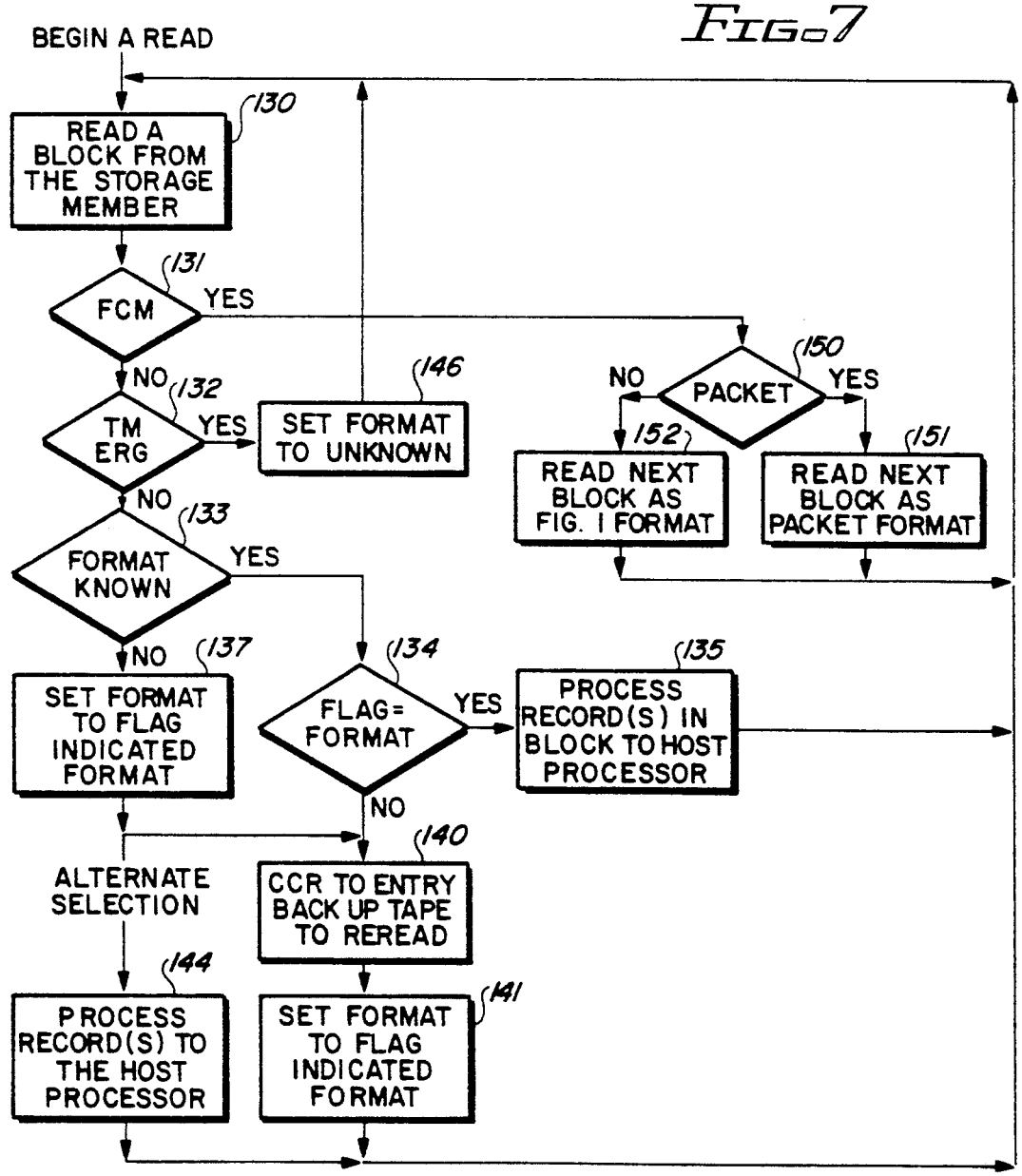
FIG. 7 is a machine operations flowchart showing the operations for reading a storage member illustrating the present invention.
Figure 8:
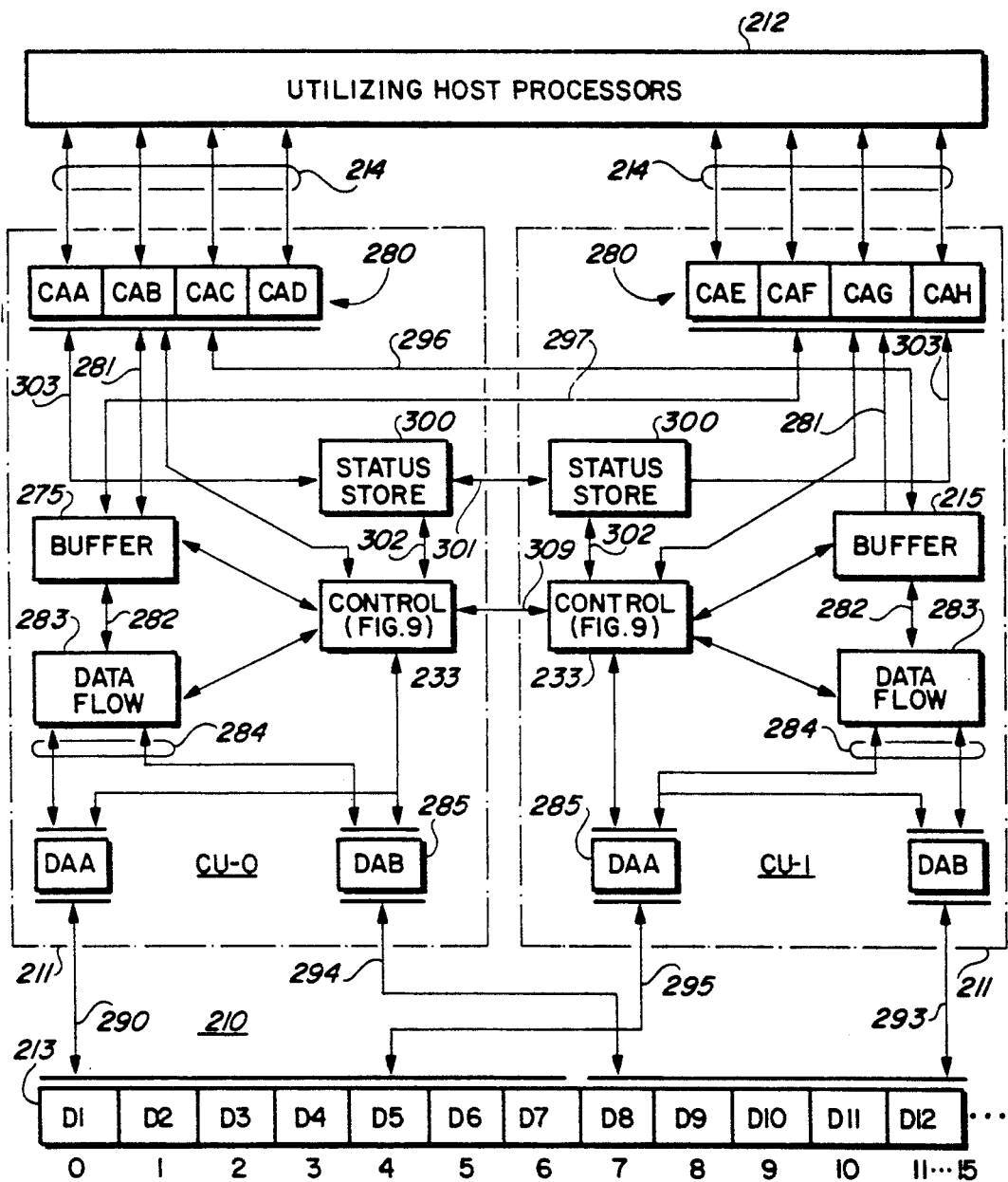
FIG. 8 is a simplified block diagram of a data processing system having a control unit for effecting the machine operations shown in FIGS. 6-7 and to operate using the FIG. 1 and 2, illustrated formats and the FIGS. 3 and 4, illustrated data structures.

In reading the signals in the packet format, as shown in FIG. 7, packer header fields 40 through 45 are first read. The packet header consisting of fields 40 through 45 contain the information necessary for the control unit 211 to begin data transfer from the control unit buffer 215 to a host processor 212 before the entire signal block is read from the tape. Control unit 211 in the read operation assumes that the data being read from storage member 460 are an unknown format, i.e., the next block being read will be in the FIG. 1 illustrated format. This action is after any non-sequential tape motion, rewind and so forth, as above described. Once any block is read and the packet format has been identified, then control unit 211 assumes that all subsequent blocks are in the packet format until a logical separator tape mark, FCM or ERG is read from the storage member 460. In the packet format the flag field 17 has a packet format flag set to the active condition, therefore the control unit can determine at the end of the first block being read, whether or not the signals being read are in the packet or in the FIG. 1 illustrated format. To deblock the packets 30-34 from the signal block 14, control unit 211 senses the 32 byte packet header at the beginning of the block, i.e., fields 40 through 45 of packet 30. The information contained in the packet header indicates the start and end addresses of the first packet which contains the first record of the signal block. At this point, each of the packets and the location of the actual record 46 in the respective packets is known. Signal transfer of the record to the host processor may then ensue before the whole signal block is read from the storage member. The packets are sequentially deblocked and the records transferred until all the packets in the block have been read and deblocked. Several signal blocks may be buffered in the read mode depending upon the size of the buffer. Further, as signal blocks are read from the tape or storage member 460 into buffer 215, sequence checking using the block ID in the block ID 18 of the block trailer is effected (see Milligan, et al., U.S. Pat. No. 4,393,445). In the packet format, the block ID values have skips in the sequence as shown in FIG. 3. Verification uses the algorithm of adding the packet count 35 to the previous block ID to determine which is the block ID of the next ensuing signal block. When the records are sent to the host processor, then the record IDs are substituted for the block IDs such that the host processor sees a continuing sequence of IDs which the host processor believes to be block IDs. Also, as set forth in FIG. 3, the identifier or ID of the first record in the block has to be the same as the block ID.

FIG. 7 is a simplified showing of machine operations for reading a block of signals from the tape. At machine step 130 the block signals are being read from the tape. At machine step 131 the read block is analyzed to determine if it is an FCM. If no, then at machine step 132 the block is examined to see if an ERG or TM is being encountered, i.e., the format of the ensuing block 12 is now unknown. If not, the current mode of reading continues. At machine step 133 the current mode is examined in the progress field 92 to ascertain if the format is known. If yes, at machine step 134 whether the flag 17 in the block is set to the current format indication in ABT 90 is checked. If the current mode is one record per block, then at machine step 122, the next ensuing record is read in the one record per block mode. If the flag format indication in the block matches the indicated format, then the read block is processed at machine step 135 as described earlier for either the packet format of FIG. 2 or for the FIG. 1 illustrated format. Then the next block on record member 460 is read at machine step 130. If at machine step 133 the format is unknown, such as set to the unknown state by a TM or ERG, then, at machine step 137, the format flag field 17 is examined to ascertain the format. In one embodiment, the just read block is then processed as it is insert into the buffer. In another embodiment, a portion of the block had been sent to the host processor and such signals may be in error. To correct the error, the read command received from the host processor which caused reading the block from tape is channel command retried (CCR'd) at machine step 140 which causes the host processor to discard the data from the block it had received and to reissue the read command to actuate the recording system to again read the block form tape. The tape is then moved to a position for rereading the block a second time. Then at machine step 141 the format indication in ABT 91 is set to match the read flag field 17. While the machine operations chart shows going immediately to machine step 130, in a practical embodiment, other machine functions would be performed waiting for the read command to be reissued. In the first mentioned embodiment of processing the read block, machine step 144 would be executed to send the data from the block to the host processor whether in the FIG. 1 illustrated format or the FIG. 2 illustrated packet format.

If at machine step 132 a TM or ERG is detected, the format indication in ABT 90 is set to an unknown state at machine step 146. Reading the next ensuing block, assuming it is not an FCM, results in an unknown format being detected at machine step 133 which then causes the format to be identified as above described.

When an FCM is recognized at machine step 131, it is determined at machine step 150 whether the ensuing format will be in the packet or in the FIG. 1 illustrated format. The ABT 91 format indicator is set accordingly. For the packet format being indicated, the next block is read as being in the packet format as indicated at machine step 151 which set the ABT format indicator to the packet format. Similarly, when the read FCM indicates a non-packet, e.g. the FIG. 1 format, format then at machine step 152 the ABT format indicator is set to the FIG. 1 format for reading the next block in that format. From machine steps 151 and 152, machine step 130 is again executed. In some embodiments, the blocks may be read from the storage medium and queued in the buffer awaiting read back processing as described herein. On the other hand, if the current mode is autoblock, i.e., packet format, then at step 124 the control unit reads the tape in the autoblock mode as above described.

When the blocks exceed a predetermined size, then a so-called synchronous mode is preferably employed in the tape recorder, such as described by Milligan, et al. in U.S. Pat. No. 4,435,762. This mode is preferably used for records exceeding 100KB length. Milligan, et al. indicate that a long record which initiates the synchronous mode has to be sensed by a control unit which means that a record has to be sent twice to establish the synchronous mode. Accordingly, even with combining the variable length records into multiple packets for recording as a single signal block is done in a manner for maintaining all other flexibilities of the recording system 210. When reading the packet format e member 460 in the backward direction, the entire block must be in a buffer 215 prior to sending data to a host 212 so that the record can be deblocked from beginning to end. This requirement may or may not have a performance impact. The performance limitation may be removed by adding an offset field 47A to each packet trailer 47, 48 which points to the packet header and thereby allowing the control unit to process the records in the block in the backward direction.

The hardware used in the invention is described with particular reference to FIGS. 8 though 11 which illustrate a storage subsystem 210 employing reel-to-reel tape drives 213 denominated as devices 213 DO-DF and having hex addresses O-F. The preferred arrangement includes two control units 210 denominated as CU-0 and CU-1. The arrangement is such that any of the devices can be connected to the hosts 212 via input-/output channel 214 through either of the control units, CU-0 or CU-1. The attachment to hosts 212 by each of the control units 211 is via a plurality of channel adaptors circuits 280 which are individually denominated CAA-CAH. Each of the channel adaptors 280 can communicate directly with a buffer 215 in either control unit 211. Both CU-0 and CU-1 are identically constructed. Accordingly, like numerals are indicating like parts in the two control units with the interconnections between the control units being separately denominated. Channel adaptors CAA-CAD are in CU-0 while CAE-CAH are in CU-1. The respective channel adaptors communicate with a buffer 215 in its own control unit via cable 281. Communications from the buffers to the devices 213 are over cable 282 through a data flow circuit 282, thence to cable 284 through a plurality of device adaptor circuits 285. The device adaptor circuits are separately denominated by characters DAA and DAB in both control units 211 and operates generally in a know manner for storage subsystems as generally known. The interconnections between the control units 211 and the devices 213 is on a primary/secondary basis. Devices D0-D7 are primary to CU-0 and secondary to CU-1. In a similar vein, devices D8-DF are primary to CU-1 and secondary to CU-0. The significance of primary and secondary connections relates to which of the control units CU-0 or CU-1 maintain status for the respective devices; i.e., the control unit CU-0 maintains status information for D0-D7 while CU-1 primarily maintains status information for D8-DF. As will become apparent, both control units CU-0 and CU-1 memorize status indications for all of the devices 13. In the primary connections, adaptor DAA of CU-0 is connected via a cable 290 to all of the devices D1-D8. In a similar manner, the connection to D8-DF to CU-1 is via cable 293 through adaptor DAA. The secondary connection from CU-0 to devices D8-DF is via cable 294 while CU-1 is connected to devices D0-D7 via cable 295. The operations between the device adaptors 285 and the various devices D0-DF includes tag control units 211 to closely control and operate devices 213.

In prior tape subsystems, the data flow paths were not fully multipathed in that the channel adaptors 280 communicated only with the data flow circuits 283 in its respective control unit 211. In the preferred configuration, any of the channel adaptors CAA-CAH can communicate with any of the device 213 through either data flow circuit 283. The internal control unit 211 connection from the channel adaptor CAA through CAD and adaptor CAE-CAH of CU-1 are as previously described. Connections from channel adaptors CAA-CAD to the buffer 15 of CU-1 is via cable 296 whereas channel adaptor CAE-CAH connects to the buffer 15 of CU-0 via cable 297. Accordingly, either data flow circuit 283 or buffer 215 can communicate with any of the hosts via any of the channel adaptors. This arrangement, or course, requires close coordination between control units 211. The total subsystem 210 status is maintained in each of the control units 211 via a pair of status stores 300. Status stores 300 communicate with each other via a cable 301 independent of data processing operations; that is, as soon as CU-0 changes status, such as by selecting a device 13, the status store 300 in CU-0 immediately communicates to status store 300 in CU-1. Similarly, any cross-connection between the channel adaptors 280 and the buffer 215 is immediately indicated in both status stores 300. Each of the status stores 300 contain a plurality of registers for containing bits relating to device status, buffer status, channel status, and the like. Such status information reflects the selection status of the device, its busy status, contingent connections and all other status necessary for operating the storage subsystem with the input/output channel 214.

One and only one control unit 211 can change the configuration of the storage system at a given time. In this regard, cables 302 extend from the respective status store 300 (a part of CNL CTL 19 of FIG. 1) to control 233. When control 233 communicates with its status store 300 and requests permission to change subsystem status. Status store 300 is an appropriate master state and permits control 233 to make a selection. Otherwise, status store 300 of CU-0 requests the status store 300 of CU-1 to give it the master state. Either CU 211 having the master state is the only one which can change logical configuration of the subsystem; the master state being shifted between the control units as configuration changes dictate. Status stores 300 also communicate with the respective channel adaptors in the control units 11 via cables 303. Such communication includes the supplying of device busy status to the channel adaptors from the status stores and the request for selection from the channel adaptors to the status stores; that is, if CAB 280 wants to select device D6 on behalf of a host request, CAB 280 communicates with its status store 300 of CU-0 requesting that the device D6 be selected. Status store 300 will supply the busy or not busy status of D6 to CAB. CAB then immediately responds to the host request with respect to device D6, thereby reducing selection and inquiry time between a host 212 and control units 211.

Figure 9:
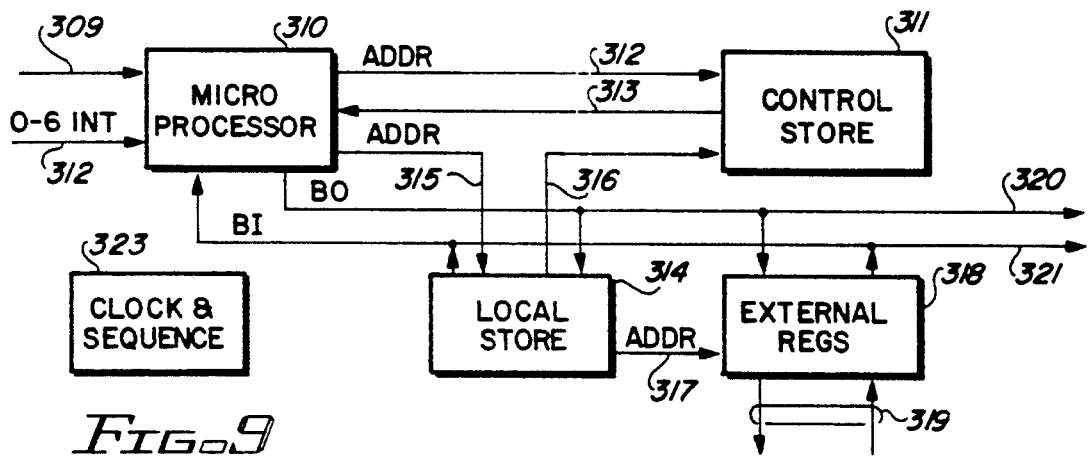
FIG. 9 is a simplified block diagram of a control used in the FIG. 8 illustrated control unit.

Control 233, can take different configurations. The configuration preferred for use in connection with the FIG. 8 illustrated storage subsystem is shown in FIG. 9. A programmed microprocessor 310 operates in accordance with microcode program stored in control store 311. Such microprograms enable microprocessor 310 to completely manage buffer 215, to provide supervised data flow circuit 283, to communicate with status store 300 and to supervise and enable selection of the channel adaptors 280 and device adaptors 285. Further, communication between controls 233 in the two CU's 211 on a processor-to-processor basis is via cable 309 using known interprocessor communications techniques. Using known interprocessor communications techniques, microprocessor 310 selects the microprograms of control store 311 via address bus 312. Control data is supplied from the control store 311, including microprogram instruction words, via bus 313. Of course, the usual idle scan loop for operating microprocessor 310 is resident in control store 311. Additionally, control 233 includes local store 314 which acts as a working control store for microprocessor 310. The addressable registers for local store 314 are addressed via bus 315. Bus 316 transfers signals from local store 314 to control store 311 under control of microprocessor 310. That is, it is preferred that the data stored in control store 311 from microprocessor 340 be transferred via local store 314. Communications between control 233 and all of the items shown in the control units 211 is via sets of external registers 318 which are addressed by address signals supplied over bus 317 from local store 314, no limitation thereto intended. Communications from external registers 318 to the various elements of the control units 211 is via a pair of undirectional buses 319 which are electrical connections made in the usual manner.

Microprocessor 310 includes the bus out BO 320 and a bus in B1 321 which are connected to local store 314, external registers 318 and other units as may be desired. Microprocessor 310 is interrupt driven through a plurality of interrupt levels. These interrupts are supplied by the various elements of the control unit 211 over bus 312 which carries interrupt signals having level 0 through 6, the priority of which is preassigned in accordance with the functions to be performed in the storage subsystem. The electrical signal timing of control units 211 is by clock and sequencer 323. Not only does clock and sequencer 323 provide timing pulses, but sequences microprocessor 310 for initializing control 283 to properly operate the control unit 211. The connections 319 from external registers 318 are to all the other portions of control unit 211.

Figure 10:
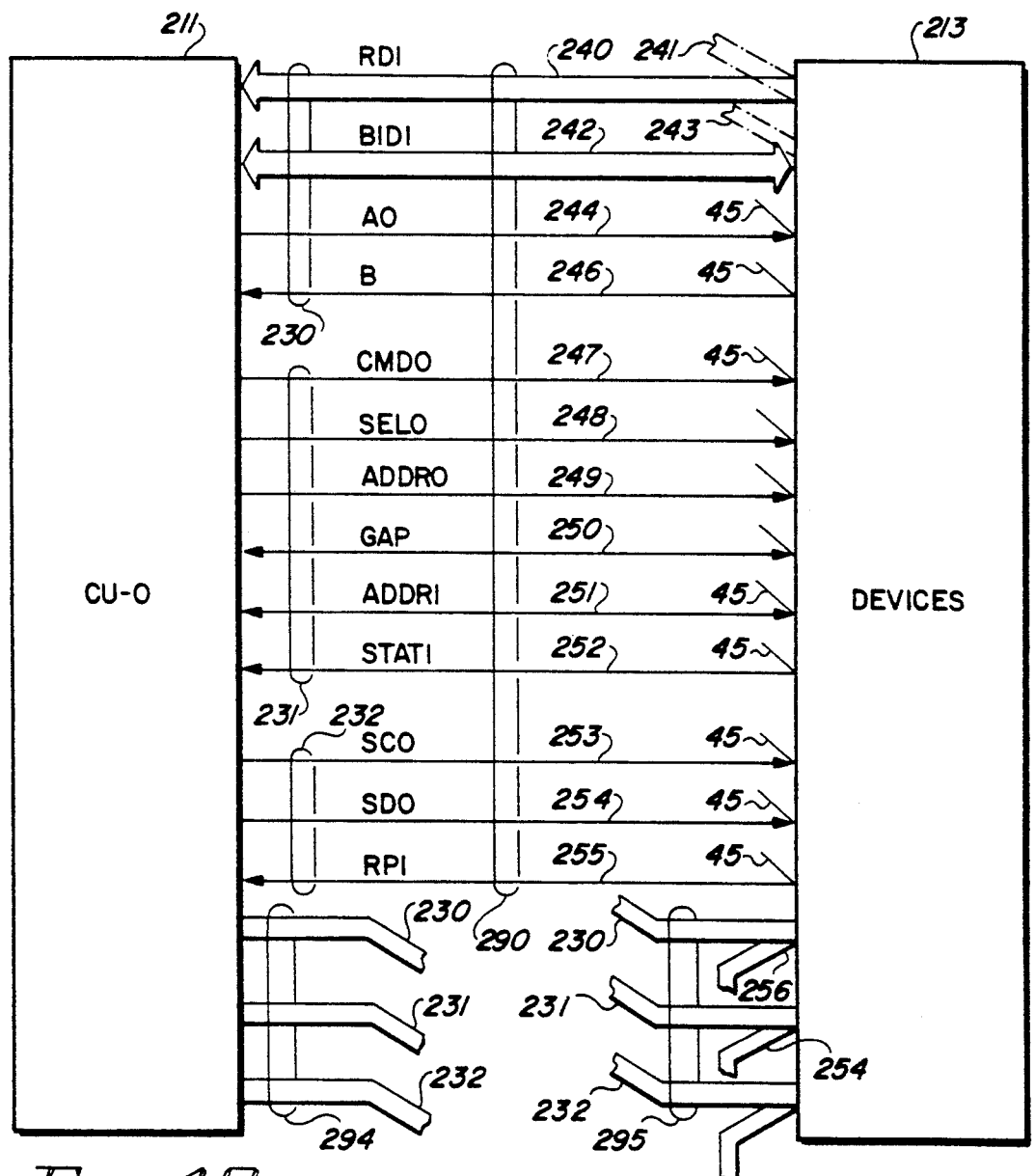
FIG. 10 is a simplified block diagram of a connection between the FIG. 8 illustrated control unit and a one of the devices attached to the control unit.

FIG. 10 illustrates the interconnections between CU-0 and a device 213. The cable 290 is expanded to show all of the interconnecting lines, while cable 294 which goes to a secondary set of devices 213 is shown truncated from CU-0. In a similar manner, cable 295 which is a secondary connection of device 213 to CU-1 is shown in truncated form. Tails 256 of cable 295 indicate a daisy-chain connection to another device 211.

In cable 290, there is a first connection 230 (RDI-read data in) which includes read data in bus 240, which transfers signals read from a tape record member 460

(FIG. 11) in device 213 to CU-0 for detection. In data flow circuits 283, RD1 240 can be 9 bits, 18 bits, or 36 bits wide, depending upon the performance desired for transferring signals from device 213 to CU-0. A second bus BIDI 242 (BIDI - bidirectional) consists of 9 signal-pairing bearing lines, 8 of which are for data, and 1 is for parity. BIDI 242 generally has odd parity, except when alert data is sent, as later described. When an ADDRESS IN signal on line 251 of connection 231 is active during a later described initial sequence or during write operations, parity can be dispensed with BIDI 242, is a bidirectional bus for transmission of addresses, commands, control orders, data to be recorded, status signals, alert and sense data. The character of the information being transmitted over BIDI 242 is indicated by the signals in the tag connection 231, as will become apparent. Tails 241 and 243 of buses 240 and 242 respectively indicate a daisy-chain connection of those buses. That is, RD1 240 and BIDI 242 go to all of the devices 213 in a primary set of devices. Tails 45 similarly indicate daisy chain connections for lines 244 to 255. When a device 213 decodes a control type command, which requires transmission of command-modifier data, it requests such modifier data by supplying a request signal over B line 246 to the control unit 211. The control unit responds by supplying a byte of such modifier data signals over BIDI 242 and validates such signals by supplying later described initial sequence or during write operations, parity can be dispensed with BIDI 242, is a bidirectional bus for transmission of addresses, commands, control orders, data to be recorded, status signals, alert and sense data. The character of the information being transmitted over BIDI 242 is indicated by the signals in the tag connection 231, as will become apparent. Tails 241 and 243 of buses 240 and 242 respectively indicate a daisy-chain connection of those buses. That is, RD1 240 and BIDI 242 go to all of the devices 213 in a primary set of devices. Tails 45 similarly indicate daisy chain connections for lines 244 to 255. When a device 213 decodes a control type command, which requires transmission of command-modifier data, it requests such modifier data by supplying a request signal over B line 246 to the control unit 211. The control unit responds by supplying a byte of such modifier data signals over BIDI 242 and validates such signals by supplying a signal over line AO 244. Device 213 responds by capturing the BIDI 242 signals and removing the B line 246 signal. This interlocked communication continues until all modifier data is transferred. For a decoded information-type command, device 213 supplies a byte of sense-type data to BIDI 242 and activates B line 246 indicating data signals are in BIDI 242. Control unit 211 responds by taking the data from BIDI 242 and supplying a signal over line A) 244. The interlocked communication continues until all requested data has been transmitted to control unit 211. For regular data transfers, i.e., data signals to be recorded on tape, the lines 244, 246 are timed by an oscillator (not shown) in device 213, i.e., B line 246 is timed. Control unit 211 actuation of line 244 signals are supplied in response to the B line 246 signals, hence timed by device 213. RDI 240 carries so-called analog information, i.e., the signals as recovered from a transducer are directed to CU-0 wherein data flow circuits 283 do all of signal processing for extracting digital data from the readback signals.

In connection 231, CMDO (Command Out) line 247 signifies that the signals placed on BIDI 242 by CU-0 are device command signals, as later described. When CMDO 247 receives an active signal during a data transfer, it means stop the data transfer presently in progress. When used to indicate a stop, CU-0 supplies no signals to BIDI 242. During a sense or control transfer, a CMDO signal is sent in a response to a clock B signal on B line 246 to also indicate stop the present data transfer. Line SELO 48 carries a select-out signal to a device 213. When SELO 248 is inactive, all inbound lines, i.e., lines carrying signals from device 213 to CU-0 except the BIDI 242 lines must become inactive. As soon as SELO 248 becomes inactive, any operation currently in process transferring signals over the cable 290 must be reset; operations in the device 213 continue to a normal or satisfactory stopping point. The on-set of an active signal on SELO 248 indicates an initial selection sequence. SELO 248 carries an active signal during the entire period of time that a device 213 is selected by CU-0 SELO 248 must become inactive between successive selections, i.e., generally successive blocks of signals being transferred between buffer 215 and a device 213. ADDRO line 249 carries an address-out tag signal from the control unit CU-0 to the attached devices 213. The address of a device 213 to be selected is supplied to BIDI 242 by CU-0. All of the devices 213 respond to the ADDRO (Address Out) 249 signal to decode the address signals on BIDI 242, when a given device 2B recognizes the B1D1 address signal as its address signal, that device 213, and only that device 213, supplies ADDRI (Address In) signal to CU-0 over line 251. Device 213 simultaneously supplies the binary two complement set of address signals on BIDI 242 for verification by CU-0. STATI (Status In) 252 is an inbound tag line which signals CU-0 that status information has been placed on BIDI 242 by the device 213 that was selected. This inbound tag line 252 is activated for indicating the operation of the CU-to-device interconnections.

Gap line 250 is a bidirectional tag line which carries a GAP OUT signal from CU-0 to device 213 to indicate to device 213 to scan for an end to an interblock gap, IBG, i.e., a non-record area (can be erased or contain special characters or signal patterns) between successive or adjacent records on a record member. Device 213 can supply a GAP IN signal, signifying that it is moving tape at operating speed for a data signal transfer. GAP OUT also indicates that a non-data area pattern has been detected in CU-0.

Preparatory connection 232 has three lines, two outbound lines and one inbound line. SCO (serial clock out) 253 is a line that carries signals supplied by CU-0 to the attached device 213 for timing data signals supplied by CU-0 over line SDO (serial data out) 254. Devices 213 do not respond to CU-0 based upon the SCO 253 signals. Rather, devices 213 only use SDO 254. SDO 254 carries control signals from CU-0 to devices 213 that are not selected, i.e., not used in connection with interconnections 230 and 231. The third line, and the single input line is RPI (repositioning in) 255, is activated by device 213 command for testing the status of device 213. The purpose of the preparatory connection is to control a device 213 which is not selected for activity on interconnections 230 and 231. This enables CU-0 to start a device 213 to operate before a data transfer operation is required for the device 213. This tends to maximize overlap of operations between a plurality of devices. The preparatory connection 232 also enables execution of certain operations which do not require the later described microprocessor to be functioning. The preparatory connection is so simple that any errors in the transfer of a command prevents the execution of that command. Device 213 responds to such an error condition over the interconnections 230 and 231 the next time it is selected by SELO 248. Device 213 then provides a Unit Check response to the attempted selection. Generally, the sequence of operations is that a device 213 which is about to be selected will receive an appropriate command over the preparatory connection 232. When a device 213 which is currently selected completes its operation or reaches a breaking point, then that device 213 will be deselected and the device 213 being prepared will be selected for a data transfer or other operation.

The peripheral devices 213 used for describing the present invention are magnetic tape recorders, such as shown in FIG. 11. The mechanical transport portion, reel-to-reel tape transport, is not shown in detail as those types of recorders are well known. A magnetic tape record member 460, preferably a ½ inch tape having a magnetic coating, is suitably transported forward and backwardly as indicated by double-headed arrow 459 past a transducer station including a transducer head assembly 461. Preferably, the transducer assembly 461 has 9, 18, 36 or 72 gaps for recording and reproducing signals on and from tape 460. The signals sensed by head assembly 461 are supplied through read circuits 462 which amplify the readback signal for transmission over RDI bus 240 to data flow circuits 263. Signals to be recorded on tape 460 are received over BIDI 242 and switched through MUX (multiplexing) circuit 463 to bus 464, thence write circuits 465 to bus 466 to transducer assembly 461. MUX circuit 463 can be any multiplexing or de-multiplexing circuit known in the electronic art. Such circuits are controlled by tag circuits 470 in response to the tag signals received over interconnection 231, such switching is performed in a usual manner. In addition to the data signals being supplied to write circuits 465, MUX circuits 463 pass the AO signal as a timing or clock signal over line 467. Further, the mode of operation, i.e., recording, is signified over line 468.

It will be remembered that BIDI 242 also transfers command signals to device 213. As shown in FIG. 11, MUX 463 switches in response to the CMDO signal on line 247 as decoded (decoding circuits not detailed) by tag circuits 470 to supply the command signals over bus 471 to microprocessor 473. Microprocessor 473 decodes the received device commands using known microcode techniques. Microprocessor 473, in general, operates the device 213 of FIG. 11. Control signals are supplied over lines 474 to write circuits 465 and read circuits 462 for indicating modes of operation, beginning of operation, and the like. Additionally, read circuits 462 supply a GAP IN indicating signal over line 474 to microprocessor 473 for relaying to control unit 211. Microprocessor 474 also supplies eight motion control signals over lines 475 to transport controls 476. Controls 476 are constructed in a usual reel-to-reel servo configuration. The mechanical transport of tape record member 460 is indicated by dash line 477 which diagrammatically represents a reel-to-reel tape transport. Microprocessor 473 in controlling device 213 employs microcode logic modules stored in a control memory 478. These microcode logic modules are transmitted to memory 478 via BIDI 242 during initialization processes of peripheral system 210, using known data processing techniques. Alternately, said logic modules are in ROM, i.e., permanently wired into device 213.

Microprocessor 473 also communicates with the connections described with respect to FIG. 10 as indicated by line 472. Tag circuits 470 supply an interruption signal to microprocessor 473 over line 480. This signal signifies to microprocessor 473 that action is required because a SELO signal was received over line 248, for example. Further, the GAP OUT signal received over line 250 by tag circuits 470 is relayed over line 481 to microprocessor 473. This signifies to microprocessor 473 that it is the end of a record and that a second gap is to ensue. Further, line 482 carries a GAP IN signal to tag circuits 470 for relaying to control unit 211 over line 250. The preparatory connection 232 has preparatory circuits 487 that are constructed similar to the tag circuits 470. An interruption signal from preparatory circuits 487 is selectively supplied over line 484 for interrupting microprocessor 473 for the purpose of executing a command received over the preparatory connection 232. Command coding supplied over bus 485 from preparatory circuits 487 to microprocessor 473 for responding to the CLAMP, UNCLAMP and RESETA commands. The RPI signal for line 255 is supplied over line 486 from microprocessor 473. RPI indicates repositioning is occurring in the device 213.

FIG. 12 diagrammatically shows a MODE SET (MS) input/output command 400. The constituents of a MODE SET command used in the illustrated embodiment are described with respect to MODE SET command 400 a first-received command in a chain of commands. MS 401 is one byte representing the command code portion itself. Fields 402-405 are in a MODE SET control byte which is appended to the actual host pattern of a MODE SET channel command code MS, all bytes being transmitted over channel 214 in accordance with established protocol set forth in U.S. Pat. No. 3,400,371. The MODE SET command bit pattern signifies that the next received byte of data will be the byte 401-405. This byte includes a format field 402 which defines the format of signals to be recorded on a magnetic tape record member being handled by the addressed one of the devices 13. For example, the format selected can be group coded recording (GCR) having a record density of 6250 bytes per lineal inch of magnetic tape record. Other formats, such as phase encoding and other special modulation codes and control formats also can be indicated by field 402. In accordance with the invention, indicator AB 404 when set indicates the autoblocking mode. Field 404 indicates other modes for example, whether or not the control unit is to be placed in the recording mode for recording signals on tape within a device 213, a readback mode, a test mode or the like. The third field 405 contains other control indicia not pertinent to the present invention.

Figure 13:
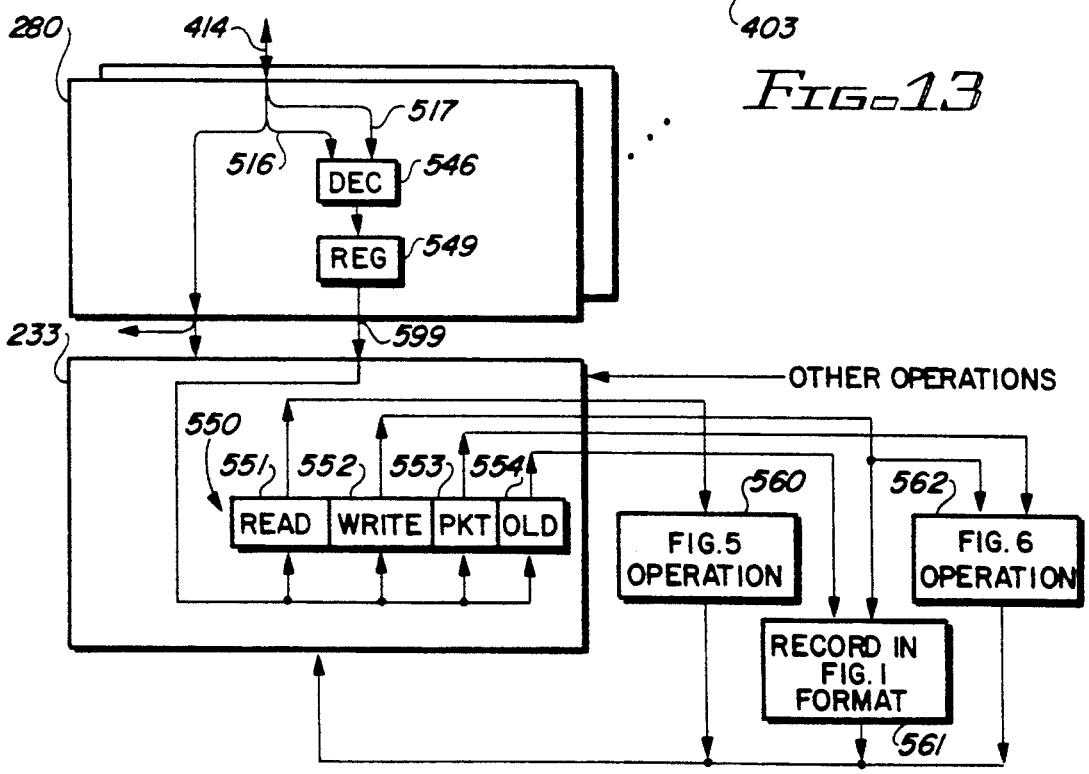
FIG. 13 is an abbreviated showing of a portion of the FIG. 9 illustrated control which responds to a FIG. 12 illustrated mode set command.

FIG. 13 shows decoding a FIG. 12 illustrated MODESET command as it pertains to the present description. Each channel adaptor 28 includes circuits for decoding a MODESET command. The MODESET command is received over cable 214 in a portion termed channel bus out 516 (see U.S. Pat. No. 4,471,457). The data on the channel bus out are indicated as being a command by a signal on a channel command out line 517 (see U.S. Pat. No. 4,471,457). The combination of data on channel bus out and the channel command out effects directing the data to decoder DEC 546. DEC 546 supplies decoded commands via register REG 549 and over bus 599 to control 233 which responds to the received command to set control registers to guide subsystem operations. FIG. 13 shows but one four-bit register 550 for indicating read mode at bit 551 and write or record mode at bit 552 (either read or write is active at any given instant). In the read mode (bit 551 is active) the machine operations shown in FIG. 7 are effected by control 233 and represented in FIG. 13 by box 560. In the record or write mode, bit 552 being active, then the machine operations shown FIG. 6 are effected by control 233 as represented in FIG. 13 by box 561 and prior art recording operations as represented in FIG. 13 by box 562. In the write mode, control 233 examines bits 553 and 554 for determining whether to record in the prior art format of one record per block (bit 554 active) as indicated by box 562 or in the packet format (bit 553 active) when record size is less than 100KB as represented by box 561. The machine operations for recording one record in a block are not separately detailed as they are known in the prior art. See the FIG. 1 illustrated format. Upon completion of the operations represented by boxes 560-562, control 233 proceeds to other operations, as is known.

While the invention has been particularly shown and described with reference to a preferred embodiment thereof, it will be understood by those skilled in the art that various changes in form and details may be made therein without departing from the spirit and scope of the invention.

What is claimed is:

1. In a data processing system having a host processor connected to a peripheral controller, a peripheral data device connected to the peripheral controller, said host processor for sending data to the controller in records of such data, said data device having a storage medium that stores said records in addressable signal blocks separated by inter-block gaps that stores none of said records:

the improvement including, in combination:
format means in the peripheral controller for receiving said records for processing the received records into a plurality of signal blocks for recording said records in the storage medium in either a first or second data format in each said signal block; said host processor having means for sending a mode setting command to the peripheral controller for commanding that records subsequently sent from the host processor to the peripheral controller are to be recorded in the storage medium by said peripheral data device in said second data format wherein each said signal block containing any of said subsequently sent records that have a first record blocking characteristic, said first record blocking characteristic including an indication of whether or not each said record has a first predetermined number of bytes of data;
said host processor having means for sending said subsequently sent records to the peripheral controller, analysis means in the format means responsive to the mode setting command to analyze said subsequently sent records for detecting said first record blocking characteristic in a predetermined one of the subsequently sent records and indicating whether or not said first record blocking characteristic was detected; and
data transfer means in the peripheral controller connected to the format means for responding to said indication of said first characteristic for formatting the subsequently sent records in said second format within each signal block wherein one of said records is contained in one of said signal blocks and being responsive to said indication indicating an absence of the first characteristic for formatting said ensuing records in each said signal block in a first format, then said data transfer means sending said signal blocks, whether in said first or second format, to said peripheral data device for recording in the storage medium.

2. In the data processing system set forth in claim 1 further including, in combination:
said format means having block size means indicating a desired average size, expressed in a number of data bytes, for each of said signal blocks; and
analysis means connected to the block size means for responding to the block size indication to establish said first blocking characteristic to include said first predetermined number as being a maximal number of bytes of data in each of the subsequently sent records for enabling a predetermined minimum number of said subsequently sent records to be contained in each of said signal blocks having said desired average size and wherein said signal block size is within one record size of the desired averaged block size.

3. In the data processing system set forth in claim 2 further including, in combination:
the host processor sending said mode setting command to include an indication that either said first format or said second format is to be used for recording next received ones of said records; and
said format means responding to the indication in the mode setting command indicating the first format for actuating the data transfer means to create a plurality of next signal blocks including inserting only one of said next received ones of said records in each of said next signal blocks.

4. In the data processing system set forth in claim 3 further including, in combination:
said format means having a format control mark means for supplying format control marks for recording in the storage medium, said format means being responsive to said mode setting command to actuate the format control mark means to supply a respective on of the format control marks for recording in the storage medium for indicating a format indicated in the mode setting command.

5. In the data processing system set forth in claim 1:
the improvement further including, in combination:
said format means for establishing a mode of operation in the data processing system for the data formats, respectively, to be used in the data recording device for recording and reading signal blocks in and from said storage medium;
read means having a portion in the data transfer means and in the data device for sensing signals recorded in the storage medium including sensing said signal blocks and said file control marks; detection means in the data transfer means connected to the read means for being responsive to one of said file control marks read from the storage medium for actuating the format means to establish a mode of operation in the data processing system for indicating that the data format of the storage medium is unascertained;
write means having a portion in the data transfer means and peripheral data device for recording said signal blocks and said file control marks in the storage medium; and said format means being responsive to a mode being set in the data processing system for actuating the write means to record a respective one of said format control marks on the storage medium to signify a change in data format.

6. In the data processing system set forth in claim 5, further including, in combination:

file mark means in the format means for establishing non-format one of said format control marks for recording in the storage medium for indicating that signal blocks have an undetermined format; and said read means being further operative when reading the storage medium in a given current format for detecting one of said non-format demarcation marks and indicating an unascertained format for the next signal blocks to be read from the storage medium.

7. In the data processing system set forth in claim 6, further including in combination:

said read means when reading the next read signal blocks having a format that has not been determined by the read means being operative for analyzing a next read signal block to ascertain which of said data formats such next signal blocks are recorded in and actuating the format means for setting a readback mode of operation in the data processing system to such ascertained data format for reading signal blocks following said first read signal block from the storage medium.

8. In the data processing system set forth in claim 7 further including in combination:

said format means having record ID means for assigning a record ID to each of said records recorded in the storage medium in signal blocks having any of said formats and continuing the record numbers throughout said formats such that in said storage medium there is one continuing sequence of record IDs.

9. In the data processing system set forth in claim 8 further including in combination:

said record ID means having means for selecting predetermined ones of said record ID's as identifiers of said format control marks, respectively, and using format predetermined ones of said record ID's for indications within said file control marks for indicating respective ones of said formats of signal blocks.

10. In the data processing system set forth in claim 8 including in combination:

said record ID means operative in said second mode to actuate the data transfer means to create said signal blocks in said second format to include assigning block IDs to each of the signal blocks, said block IDs having a same ID as the record ID of a first record in the respective signal block such that record IDs in said storage medium are a continuum of a given sequence of IDs while the block IDs have a sequence that is an arithmetic precession of the number of records stored in the respective signal blocks.

11. In the data processing system set forth in claim 10 further including in combination:

said packet means being having header means operative in the second mode with each record for creating and including a record header in each one of said signal blocks being created in said second format, said record header containing said record ID, a byte offset indication to the end of the record, a flag field, length of a packet trailer, padding bytes and an error detecting redundancy and a trailer portion having padding bytes and an error detecting redundancy for the respective records in each of said signal blocks such that each record may have a variable amount of data and remain addressable within said signal blocks.

12. In the data processing system set forth in claim 11 further including, in combination:

operation control means in the peripheral controller connected to the format means for actuating the format means while the data device is to record data in the storage medium for indicating whether all data should be recorded in said first format or the data can be recorded in either said first or second formats.

13. In the data processing system set forth in claim 12, further including in combination:

said format means being responsive to the operation control means when the data can be recorded in either said first or second format for establishing that a desired record format is unknown, and having analysis means active when the record format is unknown for analyzing in a next record being sensed as having record blocking characteristics that include predetermined data-length characteristics, expressed in bytes of data, to be recorded and for selecting said second format when said predetermined data-length characteristics are present in the first record, otherwise using said first format.

14. In the data processing system set forth in claim 13, further including, in combination:

characteristic means in the format means for establishing said data-length characteristic as a desired average size of said signal blocks, said desired average size being a block predetermined number of data bytes, said data transfer means having means operative while said write means is recording data in the storage medium in said second format for selecting a given predetermined number of said records for recording in each one of said signal blocks that creates a signal block size that approximates the desired average size of each signal block.

15. In the data processing system set forth in claim 14 further including, in combination:

said format means being operative with each of the signal blocks for establishing and activating the data transfer means for recording via said write means an indication of the format used in each respective signal block such that the format in each said signal block recorded in the storage medium can be independent of the format of other blocks on such storage medium.

16. In the data processing system set forth in claim 15 further including in combination:

said format means having packet means for establishing a predetermined number of packets to be recorded in each of the signal blocks and for inserting one of said records in each of said packets;

packet number means connected to the record ID means for inserting a record ID that identifies the record into each respective packet; and packet format means in the packet means for identifying the data format of the record in the packet such that the format of data in each of said packets is independent of the format in any other of said packets.

17. In the machine-effected method set forth in claim 16, further including the machine-executed step of:
said record ID means connected to the packet number means for assigning one of said block IDs to each said signal block.

18. In the data processing system set forth in claim 17, further including in combination:
said packet means being connected to said header means for inserting into each packet a packet header that includes said record header and that further includes which includes address information indicating a packet location within the signal block when reading in a forward direction and a format identifier for the packet.

19. In the data processing system set forth in claim 18, further including, in combination:
said packet means further inserting into the packet header a reverse address within the block for enabling reading the block in a direction opposite to a forward direction.

20. In the data processing system set forth in claim 1 wherein said data transfer means has a signal block formatter for creating each of said signal blocks by including one or more of said records in each said signal block, file marks recorded in the storage medium for indicating file boundaries, said file marks being one of said format control marks that indicating an unascertained format, further including, in combination:
buffer means for serially storing said records into said signal blocks in a predetermined sequence of signal blocks; and
block means connected to the buffer means for analyzing said signal blocks stored in the buffer for being exchanged between said host processor and said storage medium for determining whether a predetermined signal block is a format control mark, a file mark, or record containing signal block in any one of the plurality of said formats and for indicating an unascertained format when detecting a file mark, and the identity of the format as indicated in either a format control mark or a data block length, means for determining and indicating the number of bytes in each record and each signal block; and
said formatter being connected to said format means for receiving indications of formats to be used to record said records and to record said file control marks in said storage medium and for indicating to the format means a format indication detected in any format control mark read from the storage medium.

* * * * *

UNITED STATES PATENT AND TRADEMARK OFFICE
CERTIFICATE OF CORRECTION

PATENT NO. : 5,274,772
DATED : December 28, 1993
INVENTOR(S) : Edwin C. Dunn, et al.

It is certified that error appears in the above-identified patent and that said Letters Patent is hereby corrected as shown below:

At column 12, line 1, the word "(CCR,d)." should be --(CCR'd).--.

Signed and Sealed this

Twenty-first Day of June, 1994

BRUCE LEHMAN

Attest:

Attesting Officer

Commissioner of Patents and Trademarks